United States Patent [19]

Fillman

[11] 4,316,481
[45] Feb. 23, 1982

[54] WALL HYDRANT

[75] Inventor: Russell L. Fillman, Colorado Springs, Colo.

[73] Assignee: Woodford Manufacturing Company, Colorado Springs, Colo.

[21] Appl. No.: 138,581

[22] Filed: Apr. 11, 1980

[51] Int. Cl.³ .................... F16K 1/04; F16K 11/04
[52] U.S. Cl. .................................. 137/302; 251/318; 251/339
[58] Field of Search ............... 251/319, 339, 318; 137/302, 307

[56] References Cited

U.S. PATENT DOCUMENTS

| | | | |
|---|---|---|---|
| 1,257,295 | 2/1918 | Slattery et al. | 251/318 |
| 1,403,263 | 1/1922 | Mueller et al. | 251/318 |
| 2,176,947 | 10/1939 | Anagno | 251/339 X |
| 2,808,069 | 10/1957 | McCurdy | 137/302 X |
| 4,178,956 | 12/1979 | Fillman | 137/302 X |

Primary Examiner—Arnold Rosenthal
Attorney, Agent, or Firm—Zarley, McKee, Thomte, Voorhees & Sease

[57] ABSTRACT

A wall hydrant is described herein comprising a hollow tube having an inlet end and outlet end. The inlet end is adapted to be connected to a source of fluid under pressure and has a valve means adjacent its inlet end. The valve means comprises a cylindrical body portion having an inward end terminating in an arcuate nose portion. A plurality of spaced apart tab elements extend outwardly from the body portion and bear against the inward surface of the hollow tube. A valve seat portion is provided in the inlet end of the tube. A valve control rod is connected to the valve means and extends through the opposite end of the hollow tube to permit remote control of the valve means and to selectively permit the valve means to slide inwardly to a closed position on said tabs, and outwardly to an open position.

4 Claims, 7 Drawing Figures

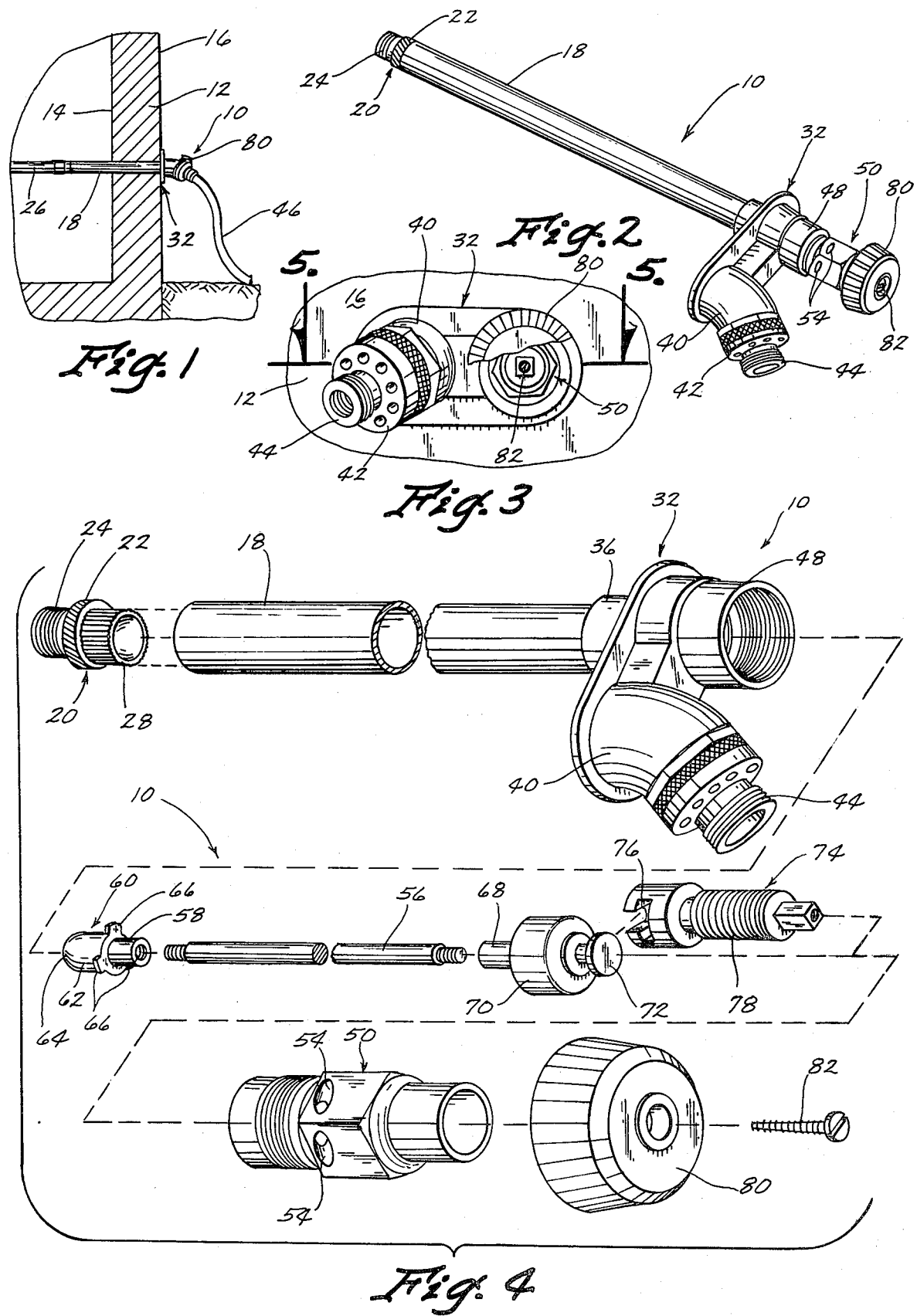

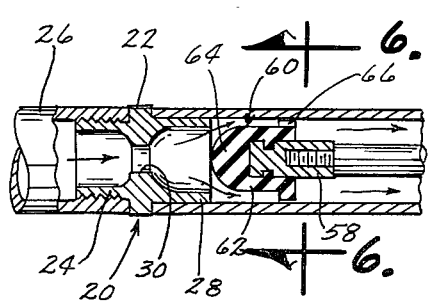
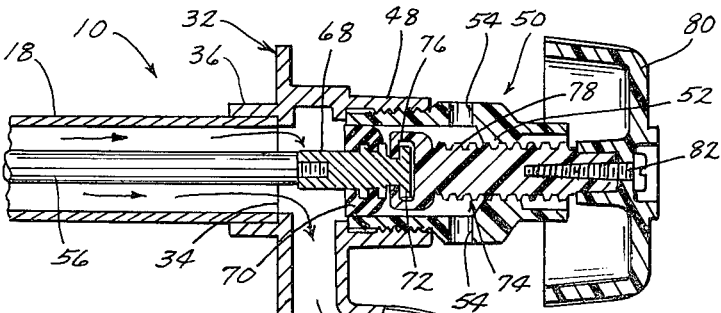
Fig. 5
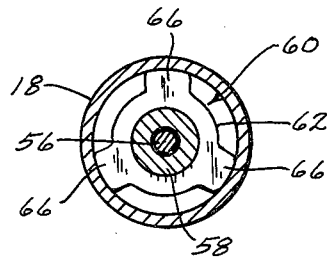
Fig. 6
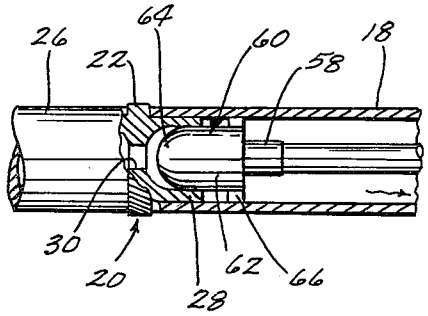
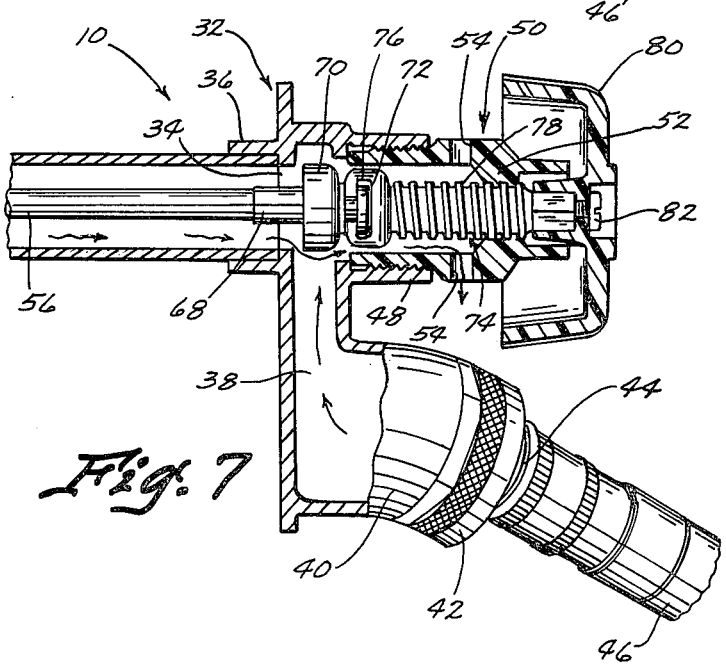
Fig. 7

WALL HYDRANT

BACKGROUND OF THE INVENTION

Wall hydrants of the prior art commonly have a valve means on the inner end thereof to effect the selective opening and closing of the hydrant to a source of fluid under pressure. The valves in such hydrants are normally expensive to fabricate. Further, these valves often chatter when opened because of the water pressure.

BRIEF SUMMARY OF THE INVENTION

A hydrant is described herein which utilizes a tube having an inlet end with an arcuate valve seat therein adapted to be in communication with a source of fluid under pressure. A valve means comprising a cylindrical body portion, an inwardly extending nose portion, and a plurality of spaced apart tabs on the body portion is adapted to control the inflow of fluid into the hydrant. When closed, the arcuate nose portion seats in the valve seat. The valve means is slidably mounted within the tube on the tabs. The opening and closing of the valve means is effected by a longitudinal rod that extends through the tube and is in communication with the outer end of the tube.

BRIEF DESCRIPTION OF THE DRAWINGS

FIG. 1 is a partial sectional view through a wall showing the normal environment of the wall hydrant described herein;

FIG. 2 is an enlarged perspective view of the wall hydrant of this invention;

FIG. 3 is an enlarged front elevation of the hydrant as it is mounted in the wall of FIG. 1;

FIG. 4 is an enlarged scale exploded view of the components of the hydrant of this invention;

FIG. 5 is a partial sectional view taken on line 5—5 of FIG. 3;

FIG. 6 is a sectional view taken on line 6—6 of FIG. 5; and

FIG. 7 is a sectional view similar to that of FIG. 5 but with the inlet valve in a closed position as contrasted to the open position shown in FIG. 5.

DESCRIPTION OF THE PREFERRED EMBODIMENT

The wall hydrant 10 is normally mounted in wall 12 having an inner side 14 and an outer side 16, as shown in FIG. 1. The hydrant 10 includes a hollow tube 18 which has a valve seat connector 20 secured to its inner end in any convenient fashion. As best shown in FIG. 4, valve seat connector 20 comprises a center flange 22 with a threaded stub 24 which is adapted to be attached to a source of fluid under pressure through pipe 26 (see FIG. 5). The valve seat connector has a valve seat 28 and an inlet aperture 30 which is best shown in FIGS. 5 and 7.

A head casting 32 is provided with an opening 34 with an annular flange 36 which is adapted to receive the outward end of tube 18. (See FIGS. 5 and 7). A laterally extending conduit 38 is provided in casting 32. Conduit 38 is in communication with outlet nozzle 40 to which is secured a vacuum breaker and backflow preventer 42. Element 42 terminates in a threaded portion 44 which is adapted to be connected to a conventional hose 46.

Casting 32 further includes an annular shoulder 48 which is internally threaded and which is co-extensive with tube 18. A hub 50 is threadably received within the annular shoulder 48. Hub 50 includes an inner threaded shoulder 52. A plurality of outlet apertures are located in the hub to permit the hydrant to be selectively drained as will be discussed hereafter.

Elongated valve control rod 56 is located on the center axis of tube 18 and has its inner end threadably secured to stud element 58. A valve element 60 is secured to stud element 58 in any convenient manner. The valve element 60 includes a cylindrical body portion 62 which terminates at its inward end in an arcuate nose portion 64. A plurality of spaced apart tabs 66 extend radially outwardly from the forward end of the cylindrical body portion 62. As shown in FIG. 5, the valve 60 along with body portion 62, nose portion 64, and tabs 66 are cross sectioned showing them to be comprised of a rubber material.

The outer end of control rod 56 is threadably secured to stud element 68. Valve element 70 is mounted on the stud element 68 in any convenient manner. The valve element 70 is adapted to seal the inner diameter of hub 50 at times as best shown in FIG. 5.

The outer end of stud element 68 terminates in a connector head 72 as best shown in FIG. 4. A connector element 74 dwells on the center axis of hub 50 and has a socket 76 which is adapted to receive the connector head 72. The connector element 74 has a threaded portion 78 which is adapted to be threadably received within the threaded shoulder 52 of hub 50. A circular handle 80 is mounted on the outer end of connector element 74 and is affixed thereto by screw 82.

The normal operation of the device of this invention is as follows: The hydrant 10 is normally mounted in a wall structure as shown in FIG. 1. The handle 80 is rotated clockwise to move the valve element 60 to a closed position as shown in FIG. 7. When this is done, the valve element 70 is in an open position as shown in the same figure. If any fluid is captured within the hydrant at that time, such as might be the case if a hose 46 was affixed to the outlet of the hydrant, the fluid can exit the hydrant as follows: As shown in FIG. 7 any entrapped fluid would move from the tube 18 or the conduit 38 past the open valve element 70 and thence into the hub 50 and out the lowermost outlet aperture 54.

When the handle 80 is rotated in an opposite direction, the threaded engagement of the threaded portion 78 of connector element 74 with the threaded shoulder 52 of hub 50 causes the valve elements 60 and 70 to move from the position of FIG. 7 to the position of FIG. 5. Fluid under pressure will thereupon move through inlet aperture 30, past valve 60 and inbetween tabs 66 and outwardly through tube 18. Valve 70 seats within the inner diameter of hub 50 and thereupon diverts the inward flow of water through conduit 38 and outwardly through the outlet nozzle 40.

Since valve 60 is supported by the three tabs 66, it is automatically centered within tube 18. Further, water pressure will not cause the valve element to vibrate or chatter, thus elementing one of the principal problems of the prior art.

In view of the foregoing, it is seen that this invention will achieve at least its stated objectives.

I claim:

1. A wall hydrant, comprising,
   a hollow cylindrical tube having an inlet end and an outlet end, a valve seat connector having an outwardly facing valve seat therein and opposite inner and outer ends, means for connecting said inner end of said valve seat connector to a source of fluid under pressure, means for connecting said outer end of said valve seat connector to the inlet end of said hollow tube, a valve means in said tube adjacent said inlet end, said valve means comprising a cylindrical body portion having inward and outward ends, with the inward end terminating in an arcuate nose portion, and a plurality of spaced apart integral tab elements extending outwardly from said body portion at the outward end thereof, said tab portions slidably engaging the interior surface of said hollow tube, said valve seat being complementary in shape to the arcuate nose portion of said valve means, and valve control means extending through said tube and being connected to said valve means to selectively longitudinally slide said valve means inwardly on said tabs to a closed position on said valve seat, and to selectively slide said valve means outwardly on said tabs to an open position whereby fluid may enter the inlet end of said tube and flow outwardly therethrough around said nose portion and said body portion and between said spaced apart tabs.

2. The device of claim 1 wherein there are three tabs on said valve means.

3. The device of claim 1 wherein said hollow tube is comprised of metal material and said valve means including said tab portions are comprised of a rubber material to minimize the vibrational chatter of the valve with respect to the hollow tube.

4. The device of claim 2 wherein said hollow tube is comprised of metal material and said valve means including said tab portions are comprised of a rubber material to minimize the vibrational chatter of the valve with respect to the hollow tube.

* * * * *